US009179217B2

(12) United States Patent
Sudo et al.

(10) Patent No.: US 9,179,217 B2
(45) Date of Patent: Nov. 3, 2015

(54) SIGNAL PROCESSING APPARATUS AND SIGNAL PROCESSING METHOD

(71) Applicant: Kabushiki Kaisha Toshiba, Tokyo (JP)

(72) Inventors: Takashi Sudo, Fuchu (JP); Osamu Sanbuichi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 156 days.

(21) Appl. No.: 14/092,354

(22) Filed: Nov. 27, 2013

(65) Prior Publication Data

US 2014/0177856 A1 Jun. 26, 2014

(30) Foreign Application Priority Data

Dec. 21, 2012 (JP) ................................ 2012-279306

(51) Int. Cl.
*H04B 3/20* (2006.01)
*H04R 3/00* (2006.01)

(52) U.S. Cl.
CPC ............ *H04R 3/002* (2013.01); *H04R 2499/11* (2013.01)

(58) Field of Classification Search
CPC ... H04R 3/002; H04R 2499/11; H04M 9/082; H04M 9/08; H04M 3/002
USPC ............... 381/66, 96, 71.1, 94.1; 379/406.01, 379/406.03, 406.05, 406.06
See application file for complete search history.

(56) References Cited

U.S. PATENT DOCUMENTS 7,555,116 B1 * 6/2009 Le Tourneur et al. .... 379/406.03
2007/0058799 A1 3/2007 Sudo

FOREIGN PATENT DOCUMENTS

| | | |
|---|---|---|
| JP | 2004-040542 | 2/2004 |
| JP | 2005-142886 | 6/2005 |
| JP | 2007-060644 | 3/2007 |
| JP | 2008-066782 | 3/2008 |
| JP | 4527342 | 6/2010 |

* cited by examiner

*Primary Examiner* — Paul S Kim
(74) *Attorney, Agent, or Firm* — Rutan & Tucker LLP; William W. Schaal

(57) ABSTRACT

According to one embodiment, a first processing module adds, to a first queue, output sound data output from a first task, with a time stamp attached thereto. A second processing module adds, to a second queue, input sound data received from a microphone, with a time stamp attached thereto. A controller fetches first output sound data as reference data from the first queue, the first output sound data having a time stamp whose time difference from a time stamp of first input sound data in the second queue falls within a predetermined range. An echo canceller performs echo cancelling processing to cancel an echo component in the first input sound data based on the reference data.

6 Claims, 9 Drawing Sheets

SIGNAL PROCESSING APPARATUS AND SIGNAL PROCESSING METHOD

CROSS-REFERENCE TO RELATED APPLICATIONS

This application is based upon and claims the benefit of priority from Japanese Patent Application No. 2012-279306, filed Dec. 21, 2012, the entire contents of which are incorporated herein by reference.

FIELD

Embodiments described herein relate generally to a technique of cancelling echoes.

BACKGROUND

In general, in communication systems, such as video conferencing systems and teleconferencing systems, hands-free telephones are widely utilized. To realize hands-free telephones, an echo canceller for cancelling echoes (acoustic echoes) is important.

As a communication system provided with an echo canceller, a system which executes processing for cancelling echoes within an apparatus such as a base station is known.

In information terminals, such as smartphones, PDAs and personal computers, an echo canceller is applicable to various applications that require processing of a sound signal received through a microphone, as well as a call application.

In conventional information terminals, sound signals used to be processed by hardware such as dedicated LSIs and DSPs. In many recent information terminals, however, sound signals are processed by software.

Echoes are caused when the sound output from a loudspeaker fed back to a microphone. To cancel an echo component from an input sound signal which input from the microphone, it is necessary to detect an output sound signal corresponding to the echo component. However, since in many information terminals, a non-realtime OS is used, it is difficult to accurately synchronize a task for sending an output sound signal to the loudspeaker with a task for acquiring an input sound signal through the microphone. Therefore, there is a case where the input and output sound signals cannot be synchronized, thereby making echo cancelling operation unstable.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

DETAILED DESCRIPTION

Various embodiments will be described hereinafter with reference to the accompanying drawings.

In general, according to one embodiment, a signal processing apparatus is configured to execute a plurality of tasks. The tasks include a first task for sending, to a loud speaker of the signal processing apparatus, a reproduction target sound stream received from an application layer, and a second task for acquiring a sound stream from a microphone of the signal processing apparatus. The apparatus includes a first processing module, a second processing module, a controller and an echo canceller. The first processing module is configured to add, to a first queue, output sound data output from the first task, with a time stamp attached to the output sound data. The second processing module is configured to add, to a second queue, input sound data which is acquired from the microphone by the second task, with a time stamp attached to the input sound data. The controller is configured to fetch first output sound data as reference data from the first queue, the first output sound data having a time stamp whose time difference from a time stamp of first input sound data in the second queue falls within a predetermined range, the first input sound data being leading input sound data of the second queue. The echo canceller is configured to perform echo cancelling processing to cancel an echo component in the first input sound data based on the reference data.

Figure 1:
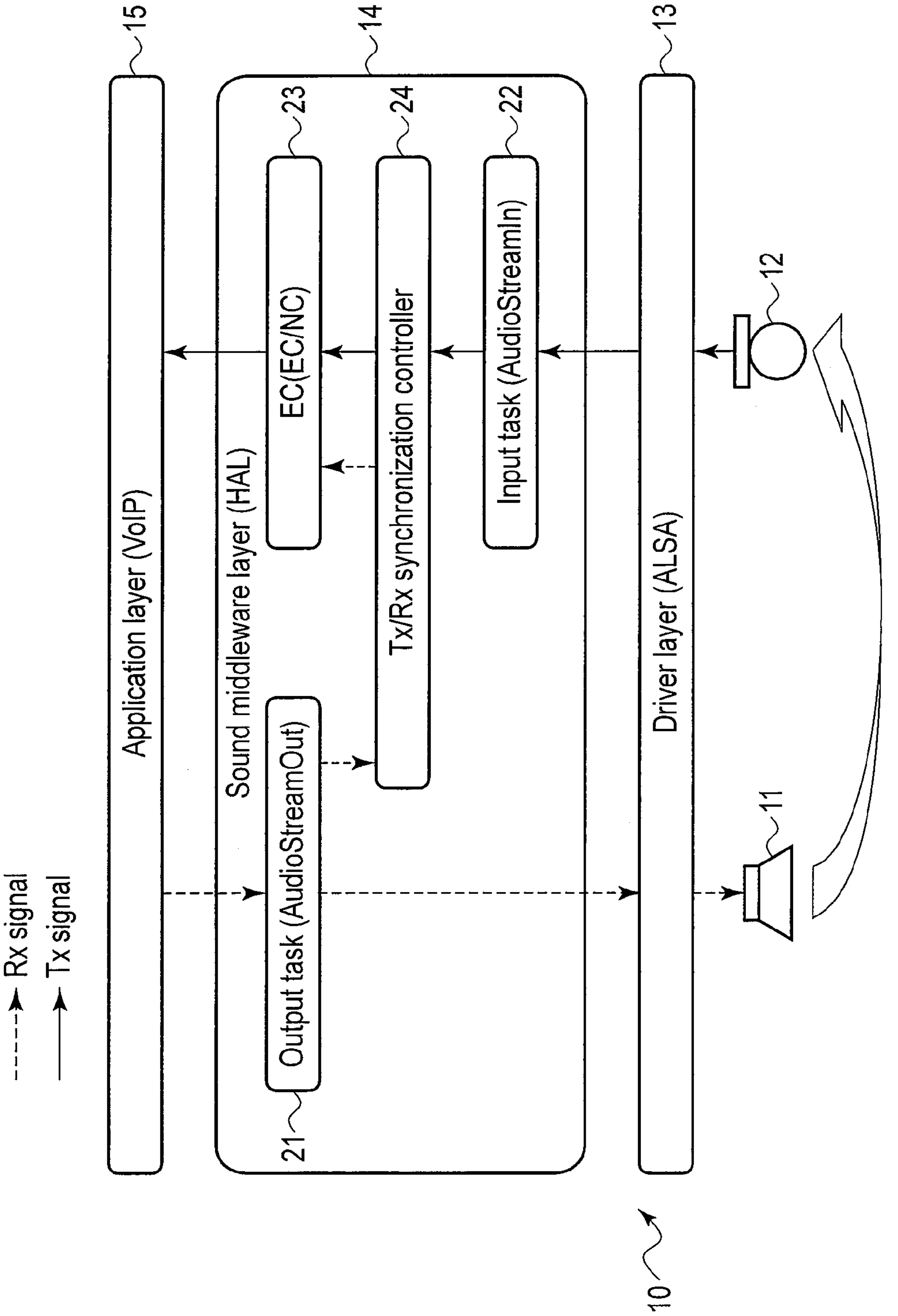
FIG. 1 is an exemplary block diagram illustrating a configuration of a signal processing apparatus according to an embodiment.

FIG. 1 shows the configuration of the signal processing apparatus 10 of an embodiment. The signal processing apparatus 10 can be realized as an information terminal, such as a tablet, a smart phone and a personal computer. The signal processing apparatus 10 comprises a loud speaker 11 and a microphone 12. The signal processing apparatus 10 can process sound data using software. The signal processing apparatus 10 is configured to execute a plurality of tasks including an output task 21 and an input task 22. Each of the tasks may be a process or a thread.

The software for processing sound data may include three layers operable on the operating system, i.e., a driver layer 13, a sound middleware layer 14 and an application layer 15. As the operating system, Android™ OS may be used. When using Android™ OS, the driver layer 13 may be ALSA (Advance Linux Sound Architecture), and the sound middleware layer 14 may be the HAL (Hardware Abstraction Layer) of Android™ OS. The HAL is a software layer for abstracting hardware.

The output task 21 is a sound output task for sending, to the loud speaker 11, a reproduction target sound stream (Rx signal sequence) which is received from the application layer 15. The output task 21 may be AudioStreamOut of Android™ OS. The AudioStreamOut is a thread for abstracting sound (audio) output hardware. The output task 21 is on the above-mentioned sound middleware layer 14.

The application layer 15 is realized by one or more application programs for processing sound data (speech signal, or audio signal such as music). Alternatively, the application layer 15 may be an application program for performing speech communication between terminals using a communication protocol such as VoIP. Such a communication protocol as VoIP can be used to execute various speech communications including TV conference, teleconference, video chatting, voice chatting and IP phone communications.

The input task 22 is a sound input task for acquiring a sound stream (Tx signal sequence) from the microphone 12. The input task 22 may be AudioStreamIn of Android™ OS. The AudioStreamIn is a thread for abstracting sound (audio) input hardware. The input task 22 is on the above-mentioned sound middleware layer 14.

The output task 21 and the input task 22 are independent of each other, and hence operate asynchronously.

An echo canceller (EC) 23 performs echo cancelling to cancel an echo component in first input sound data received from the input task 22 by subtracting an echo replica signal (echo component) from the first input sound data. The echo replica signal is estimated from output sound data output from the output task 21. The echo canceller (EC) 23 can be realized by the software on the sound middleware layer 14. The echo canceller (EC) 23 may also incorporate a noise cancelling function.

In the echo canceller (EC) 23, it is necessary to estimate an echo component in input sound data (Tx signal), based on output sound data (Rx signal) corresponding to the input sound data (Tx signal). To this end, in the echo canceller (EC) 23, it is necessary to synchronize the Tx signal with the Rx signal in input timing. This requires synchronization control between data items sent from the two threads (the output task 21 and input task 22), that is, requires synchronization control between the input sound data (Tx signal) and the output sound data (Rx signal).

As described above, the output task (AudioStreamIn) 21 and input task (AudioStreamOut) 22 are asynchronous tasks (asynchronous threads). For instance, when VoIp operation is started, the operation initiation timing of the output task 21 may differ from that of the input task 22. When VoIp is started, the output task 21 may start earlier than the input task 22. Further, during VoIP operation, there may be a phenomenon (fluctuation) where the number of output sound data items (Rx signal) from the output task 21 may be larger than that of input sound data items (Tx signal) from the input task 22, that is, an extra Rx signal may be input. Upon occurrence of such fluctuation, the input timing of the Tx signal gradually deviates from that of the Rx signal, with the result that the Tx and Rx signals become asynchronous. To avoid this, it is necessary to make the input timing of the Rx signal coincide with that of the Tx signal at the start of VoIP. Further, during VoIP operation, it is necessary to determine whether the input timing of the Tx signal deviates from that of the Rx signal, and if deviation in input timing is detected, the Tx and Rx signals must be adjusted in input timing.

In view of the above, the signal processing apparatus 10 of the embodiment incorporates a Tx/Rx synchronization controller 24 configured to perform synchronization control between the Tx and Rx signals. The Tx/Rx synchronization controller 24 is positioned on the sound middleware layer (HAL) 14. The Tx/Rx synchronization controller 24 sequentially receives input sound data (Tx signal) and the output sound data (Rx signal) from the output task (AudioStreamIn) 21 and the input task (AudioStreamOut) 22, and performs synchronization control for enabling the echo canceller (EC) 23 to receive a certain input sound data item (Tx signal) and an output sound data item (Rx signal) corresponding to the certain input sound data item (Tx signal).

Figure 2:
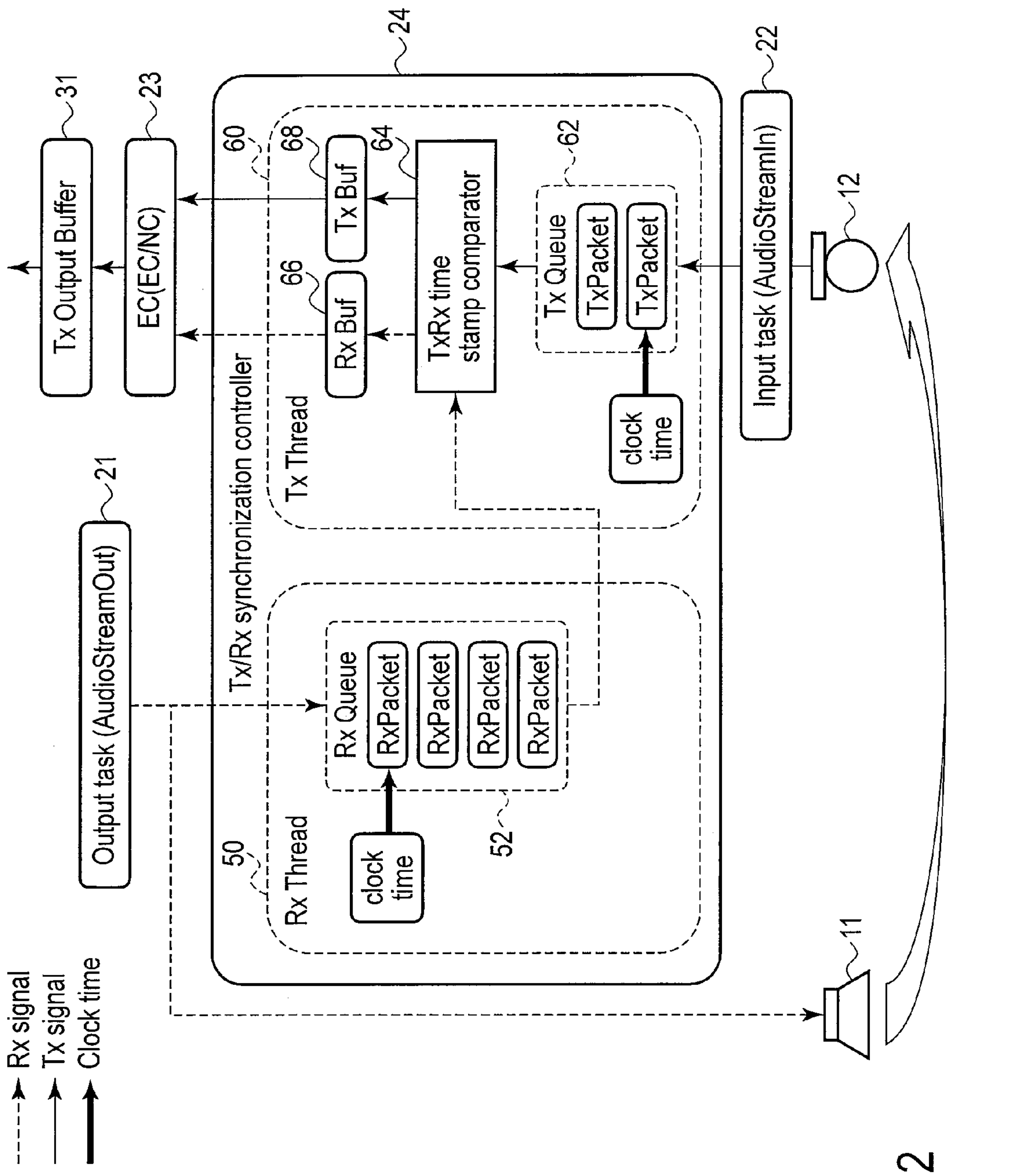
FIG. 2 is an exemplary block diagram illustrating a configuration of a Tx/Rx synchronization controller incorporated in the signal processing apparatus according to the embodiment.

FIG. 2 shows the configuration of the Tx/Rx synchronization controller 24. As shown, the Tx/Rx synchronization controller 24 comprises an Rx thread 50 and a Tx thread 60.

The Rx thread 50 is configured to add, to an Rx queue 52, output sound data (Rx signal) output from the output task 21, with a time stamp attached to the output sound data (Rx signal). The Rx queue 52 is a variable length queue. The output sound data output from the output task 21 is sent to the loud speaker 11 and to the Rx thread 50. When the Rx thread 50 receives the output sound data, the Rx thread 50 acquires a time stamp (current clock time), and adds, to the Rx queue 52, a packet (Rx packet) including the output sound data and the time stamp. The time stamp indicates the timing at which the output sound data has been received by the Rx thread 50.

The Tx thread 60 is configured to add, to a Tx queue 62, input sound data (Tx signal) which is acquired from the microphone 12 by the input task 22, with a time stamp attached to the input sound data (Tx signal). The Tx queue 62 is a variable length queue. When the Tx thread 60 receives the input sound data, the Tx thread 60 acquires a time stamp (current clock time), and adds, to the Tx queue 62, a packet (Tx packet) including the input sound data and the time stamp. The time stamp indicates the timing at which the input sound data has been received by the Tx thread 60.

The Tx thread 60 further comprises a Tx/Rx time stamp comparator 64. The Tx/Rx time stamp comparator 64 functions as a controller for fetching, from the Rx queue 52, output sound data (first output sound data) as reference data, which has a time stamp whose time difference from the time stamp of the leading input sound data (first input sound data) in the Tx queue 62 falls within a predetermined range. The above-mentioned first input sound data is sent to the echo canceller (EC) 23 via a Tx buffer 68, and the above first output sound data is sent to the echo canceller (EC) 23 via an Rx buffer 66. The above-mentioned predetermined range has a preset time length.

As described above, the output and input tasks 21 and 22 are separate tasks, and operate asynchronously. Accordingly, if it is attempted to fetch, from the Rx queue 52, output sound data having a time stamp identical to that of the leading input sound data (first input sound data) in the Tx queue 62, it is possible that such output sound data will not easily be detected and hence echo cancelling processing be not executed for a relatively long time. In this case, input sound data containing an echo component may be transmitted to a remote terminal (far end).

In this embodiment, in light of the fact that the output and input tasks 21 and 22 operate asynchronously, output sound data (first output sound data) having a time stamp whose time difference from the time stamp of the leading input sound data (first input sound data) in the Tx queue 62 falls within a predetermined range is fetched as reference data from the Rx queue 52. Therefore, even in the environment in which the output and input tasks 21 and 22 operate asynchronously, namely, even if the above-mentioned fluctuation occurs, an echo component can be estimated reliably, thereby realizing reliable echo cancelling processing.

More specifically, the Tx/Rx time stamp comparator 64 firstly checks the amount of data accumulated in each of the Tx and Rx queues 62 and 52. If each of the Tx and Rx queues

62 and 52 accumulates data of a data size more than that necessary for the echo cancelling processing, the Tx/Rx time stamp comparator 64 compares the time stamp (Tx Time) of the leading input sound data in the Tx queue 62 with the time stamp (Rx Time) of the leading output sound data in the Rx queue 52. If the time difference (=Tx Time−Rx Time) between the time stamps falls within the above-described predetermined range, the Tx/Rx time stamp comparator 64 may inform the echo canceller (EC) 23 that the leading input sound data in the Tx queue 62 is synchronized with the leading output sound data in the Rx queue 52. As a result, the Tx/Rx time stamp comparator 64 can make the echo canceller (EC) 23 to execute echo cancelling processing using the leading output sound data in the Rx queue 52 and the leading input sound data in the Tx queue 62.

In echo cancelling processing, the echo canceller (EC) 23 uses the leading output sound data in the Rx queue 52 as reference data. For instance, the echo canceller (EC) 23 convolves the reference data and a filter coefficient that models a transfer function used between the loud speaker 11 and the microphone 12, thereby estimating an echo replica signal (echo component) corresponding to the reference data. Then, the echo canceller (EC) 23 subtracts the echo replica signal from the leading input sound data in the Tx queue 62. The input sound data resulting from the subtraction of the echo replica signal is sent to the application layer 15 via a Tx output buffer 31. Thus, the echo canceller (EC) 23 executes processing of cancelling the echo component in the leading input sound data of the Tx queue 62, based on the reference data.

In contrast, if the time difference (=Tx Time−Rx Time) between the time stamp of the leading input sound data in the Tx queue 62 and the time stamp of the leading output sound data in the Rx queue 52 falls outside the above-described predetermined range, the Tx/Rx time stamp comparator 64 determines that the Tx and Rx signals deviate from each other in timing, i.e., that the leading output sound data of the Rx queue 52 is extra (old) output sound data. In this case, the Tx/Rx time stamp comparator 64 discards the leading output sound data of the Rx queue 52, and moves the second output sound data of the Rx queue 52 to the front end of the Rx queue 52. After that, the Tx/Rx time stamp comparator 64 again compares the time stamp of the leading input sound data of the Tx queue 62 with that of the new leading output sound data of the Rx queue 52. By thus discarding the extra (old) output sound data, the Tx and Rx signals are adjusted in timing.

Synchronization control performed at the start of VoIP will now be described. At the start of VoIP, there is a case where the output task (AudioStreamOut) 21 starts operation earlier than the input task 22. In this case, firstly, some Rx packets are accumulated in the Rx queue 52. After that, the input task 22 starts operation to accumulate TX packets in the Tx queue 62. The Tx thread 60 compares the time stamp of the leading Tx packet of the Tx queue 62 with that of the leading Rx packet of the Rx queue 52. There is a case where the Rx packet is rather older than the Tx packet. At this time, there is a large time difference (Tx Time−Rx Time) between the time stamps, and therefore the Tx thread 60 determines that the deviation of the synchronization has occurred, and discards the Rx packet from the Rx queue 52. Until the time difference (Tx Time−Rx Time) between time stamps is sufficiently reduced, some Rx packets subsequent to the leading Rx packet of the Rx queue 52 are sequentially discarded.

Synchronization control during VoIP operation will be described. During VoIP operation, there is a case where a greater amount of output sound Rx data than Tx data is generated. In this case, the output task (AudioStreamOut) 21 sequentially outputs output sound data (Rx signal) to accumulate extra data in the Rx queue 52. Since, at this time, a plurality of Rx packets are generated within a short period, plural Rx packets with small time stamp differences are accumulated in the Rx queue 52. The time stamps corresponding to the Tx packets accumulated in the Tx queue 62 are increased at substantially regular intervals, while the time stamps corresponding to the Rx packets accumulated in the Rx queue 52 is not greatly increased. Accordingly, the time difference (Tx Time−Rx Time) between the leading Tx packet of the Tx queue 62 and the leading Rx packet of the Rx queue 52 becomes great, whereby the deviation of the synchronization is detected. When the deviation of the synchronization is detected, the leading Rx packet of the Rx queue 52 is discarded.

Figure 3:
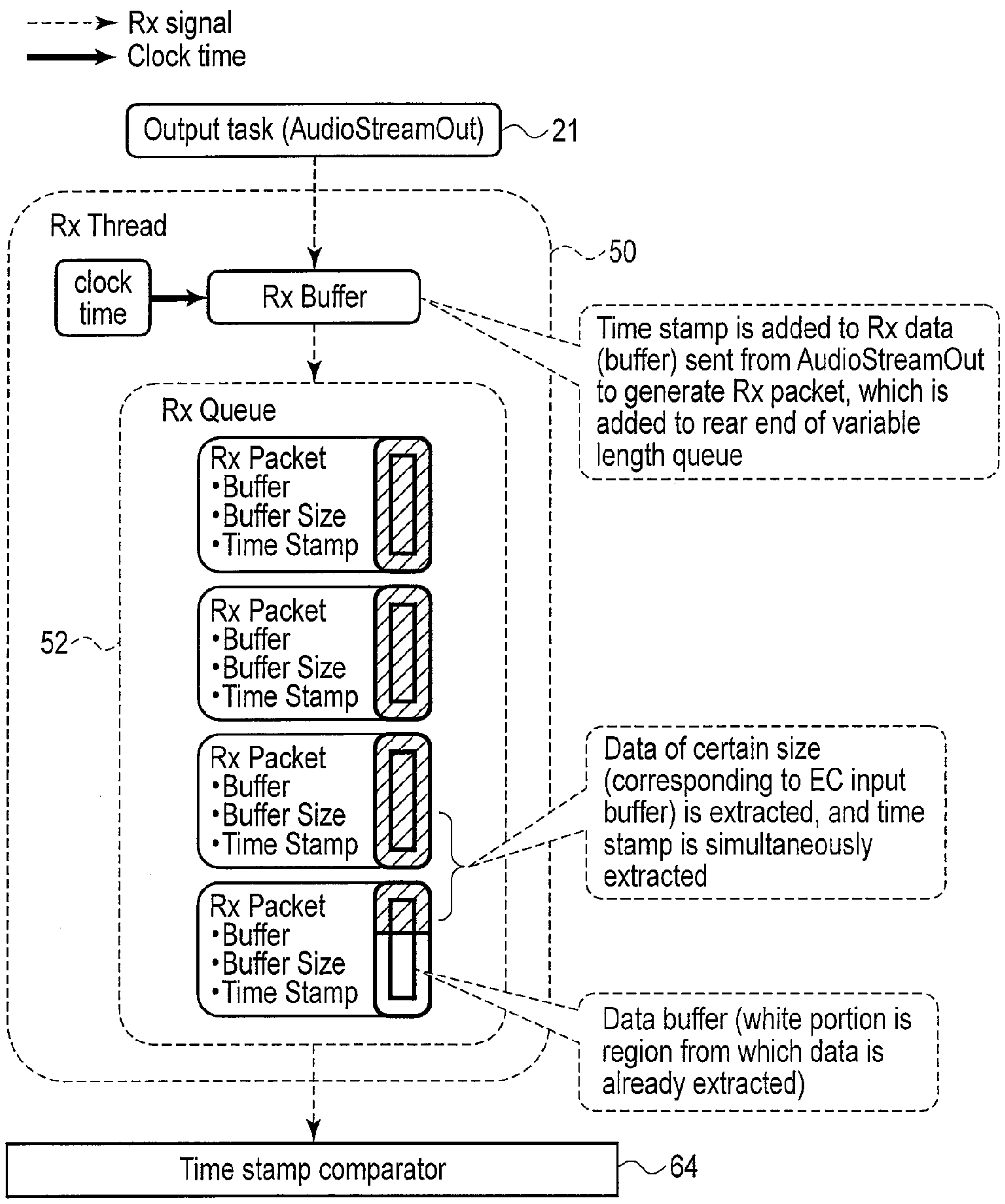
FIG. 3 is an exemplary view illustrating a structure example of each Rx packet generated by an Rx thread in the Tx/Rx synchronization controller shown in FIG. 2.

FIG. 3 shows a structure example of each Rx packet generated by the Rx thread 50. The Rx thread 50 generates an Rx packet by imparting a time stamp to output sound data (buffer) received from the output task 21. Subsequently, the Rx thread 50 adds the Rx packet to the rear end of the variable length Rx queue 52. The Rx packet comprises output sound data (buffer), and information indicating its data size (buffer size) and its time stamp.

The output sound data of a data size (EC input buffer size) necessary for echo cancelling processing is fetched from the Rx queue 52, and the time stamp corresponding to the data is simultaneously fetched from the Rx queue 52. The EC input buffer size may be a data size corresponding to the filter length of an adaptive filter used for echo cancelling processing.

The Tx packet has the same structure as the Rx packet. Namely, the Tx packet comprises input sound data (buffer), and information indicating its data size (buffer size) and its time stamp.

Figure 4:
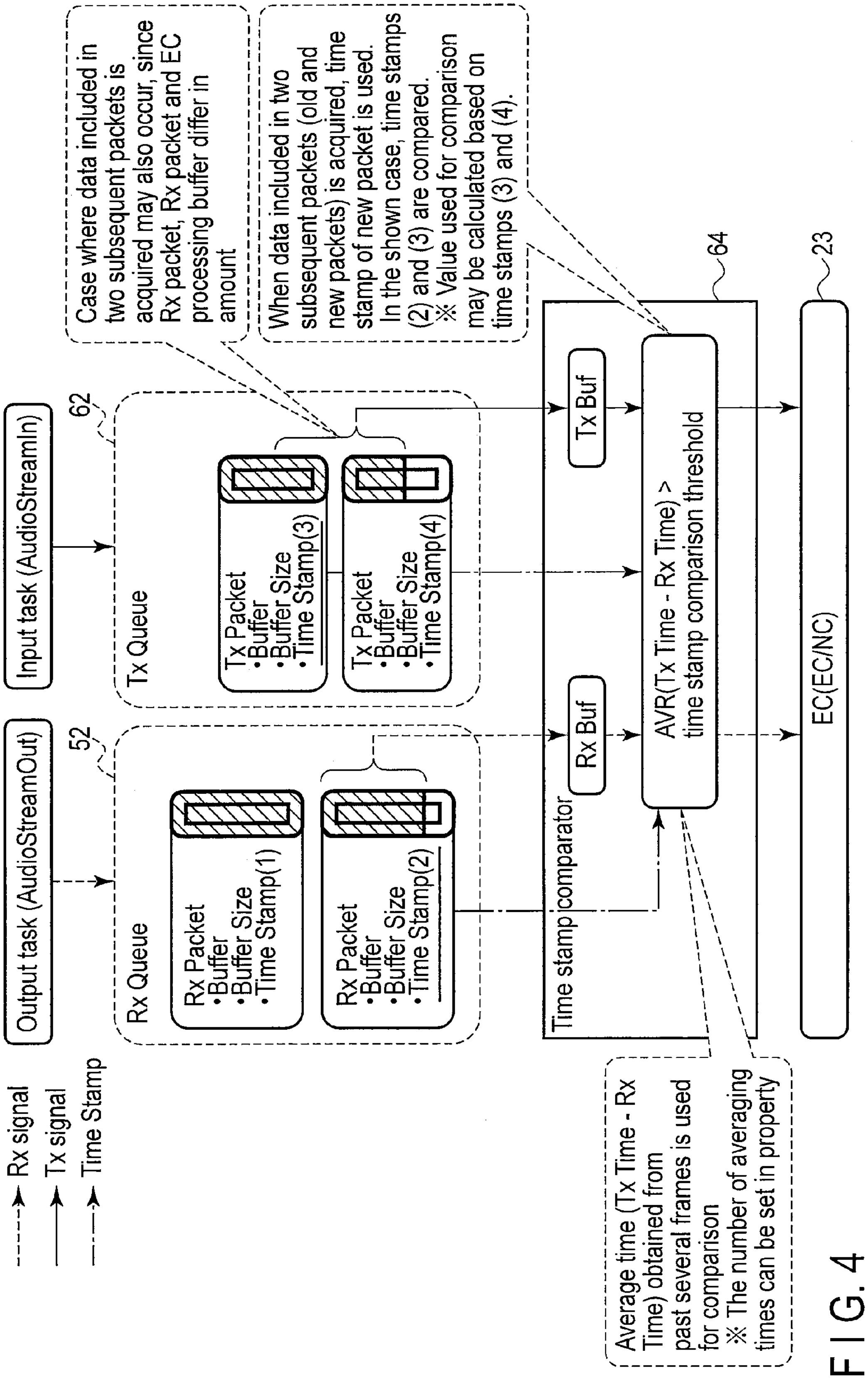
FIG. 4 is an exemplary view illustrating the operation of the Tx/Rx synchronization controller shown in FIG. 2.

FIG. 4 shows the operation of the Tx/Rx synchronization controller 24. When each of the Tx queue 62 and the Rx queue 52 accumulates data of a data size corresponding to the EC input buffer size, the Tx/Rx synchronization controller 24 fetches leading data items from the Tx queue 62 and the Rx queue 52. Simultaneously, the Tx/Rx synchronization controller 24 fetches the time stamps corresponding to the leading data items from the Tx queue 62 and the Rx queue 52, and compares them (time stamp comparison processing).

The data size of the output sound data in the Rx packet, that of the input sound data in the Tx packet, and the EC input buffer size differ from each other. Therefore, a case may occur in which input sound data ranging from posterior part of a certain Tx packet to anterior part of a subsequent Tx packet, with the boundary therebetween included, is acquired. Similarly, a case may occur in which output sound data ranging from posterior part of a certain Rx packet to anterior part of a subsequent Rx packet, with the boundary therebetween included, is acquired.

When data included in subsequent two packets (old and new packets) has been acquired, the time stamp of the packet (new packet) newly used for data acquisition may be used for time stamp comparison processing. FIG. 4 shows a case where input sound data ranging from part of a certain Tx packet to part of a subsequent Tx packet is acquired. In FIG. 4, time stamp (2) and time stamp (3) are compared (time stamp (3) is used as the time stamp corresponding to the input sound data ranging from part of a certain Tx packet to part of a subsequent Tx packet). Alternatively, a new time stamp used for time stamp comparison processing may be calculated based on the time stamps (3) and (4). In this case, the weighted average of the time stamps of old and new packets may be calculated, based on the ratio between the data size acquired from the new packet and that acquired from the old packet.

In the time stamp comparison processing, the Tx/Rx synchronization controller 24 may calculate the average (AVR (Tx Time−Rx Time)) of time stamp differences corresponding to past several frames.

This average calculation will be described in more detail. In the current time stamp comparison, the Tx/Rx synchronization controller 24 calculates the current time difference (Tx Time−Rx Time) between the time stamp of the leading Rx packet in the Rx queue 52 and that of the leading Tx packet in the Tx queue 62. The Tx/Rx synchronization controller 24 uses not only this current time difference, or but a plurality of past time differences. The plurality of past time differences are time differences which are calculated in a certain number of time stamp comparisons immediately before the above-mentioned current time stamp comparison. After that, the Tx/Rx synchronization controller 24 may calculate the average (moving average) of the above all time differences including the current time difference and the plurality of past time differences, as the above-mentioned average (AVR (Tx Time−Rx Time)). Depending upon whether the moving average is greater than a threshold corresponding to the above-described predetermined range, the Tx/Rx synchronization controller 24 determines whether the deviation of the synchronization has occurred. By thus determining presence/non-presence of the deviation of the synchronization using the moving average, reliable determination operation, which is substantially free from momentary fluctuation in the time stamp of the Rx and/or Tx packet, can be realized.

Figure 5:
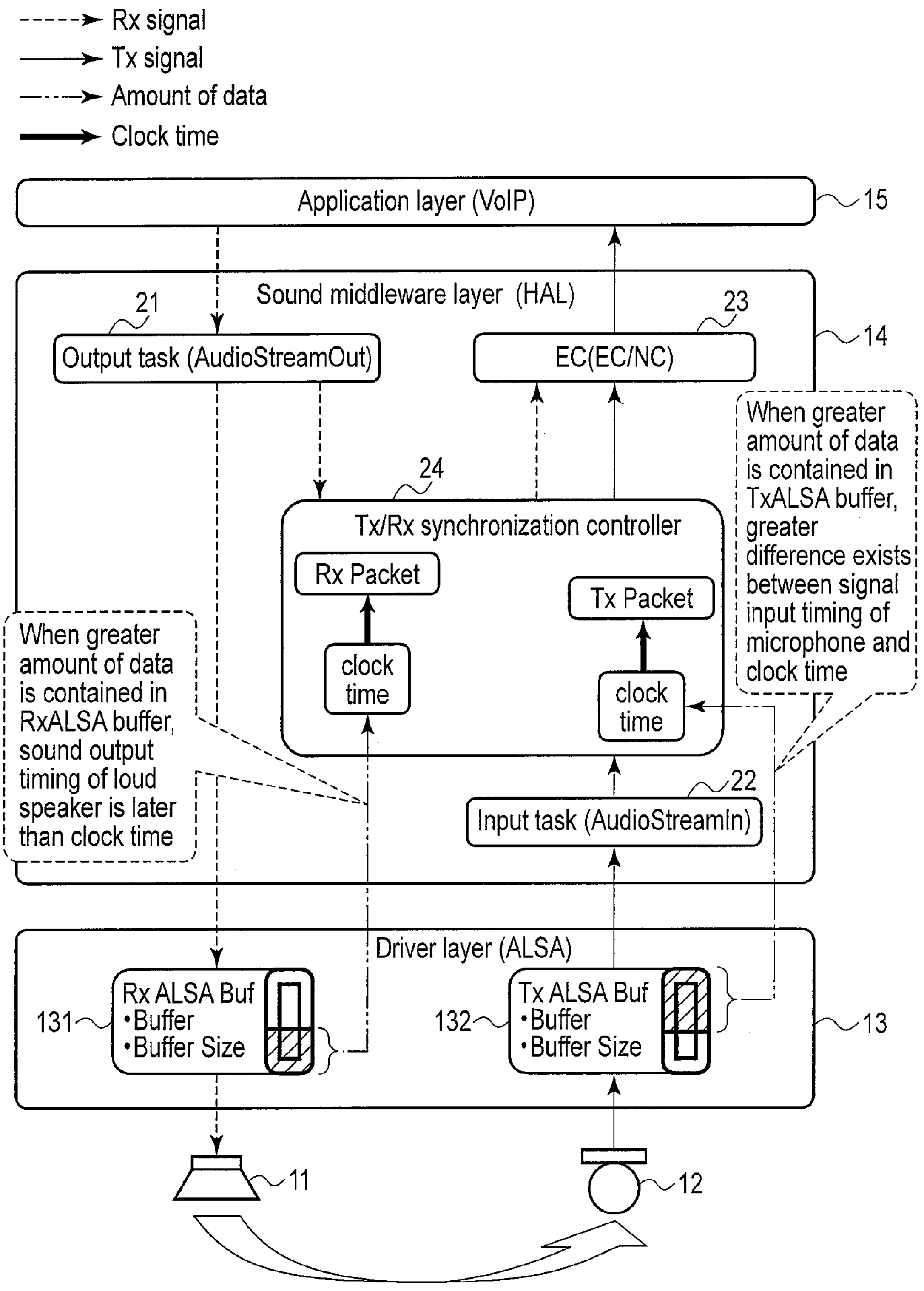
FIG. 5 is an exemplary view illustrating a time stamp imparting operation executed by the Tx/Rx synchronization controller shown in FIG. 2.

FIG. 5 shows an example of a time stamp imparting operation performed by the Tx/Rx synchronization controller 24.

The above-mentioned driver layer 13 exists as a layer closer to hardware than the sound middleware layer 14. Also in the driver layer 13, Tx/Rx signals may be buffered. In this case, the timing at which an Rx signal transferred from the output task (AudioStreamOut) 21 to a lower layer is output through the loud speaker 11 may depend upon the degree of embedding of data in a sound output buffer (RxALSABuf) 131 in the driver layer 13. If a greater amount of data is accumulated in the sound output buffer (RxALSABuf) 131, the timing at which a sound corresponding to the Rx signal is output from the loud speaker 11 may be later than the clock time imparted to the Rx signal as a time stamp.

As described above, when receiving an Rx signal from the output task 21, the Tx/Rx synchronization controller 24 acquires a current clock time, and imparts the clock time as a time stamp to the Rx signal. In this case, the Tx/Rx synchronization controller 24 may correct the above clock time (time stamp) in accordance with the amount of data stored in the sound output buffer (RxALSABuf) 131. The clock time (time stamp) may be corrected by adding, to the clock time, an offset value corresponding to the data accumulated in the sound output buffer (RxALSABuf) 131, so that the clock time (time stamp) to be imparted to the Rx signal will be advanced by the time corresponding to the accumulated data amount.

Similarly, the timing at which a Tx signal is output from the input task (AudioStreamIn) 22 may depend upon the degree of embedding of data in a sound input buffer (TxALSABuf) 132 in the driver layer 13. If a greater amount of data is accumulated in the sound input buffer (TxALSABuf) 132, the timing at which the Tx signal is output from the input task (AudioStreamIn) 22 is later than the timing at which a sound signal is input to the microphone 12. As described above, the Tx/Rx synchronization controller 24 acquires a current clock time and imparts the clock time as a time stamp to a Tx signal when receiving the Tx signal from the input task 22. At this time, the Tx/Rx synchronization controller 24 may correct the above clock time (time stamp) in accordance with the amount of data stored in the sound input buffer (TxALSABuf) 132. The clock time (time stamp) may be corrected by subtracting, from the clock time, an offset value corresponding to the data accumulated in the sound input buffer (TxALSABuf) 132, so that the clock time (time stamp) to be imparted to the Tx signal will be delayed by the time corresponding to the accumulated data amount.

Figure 6:
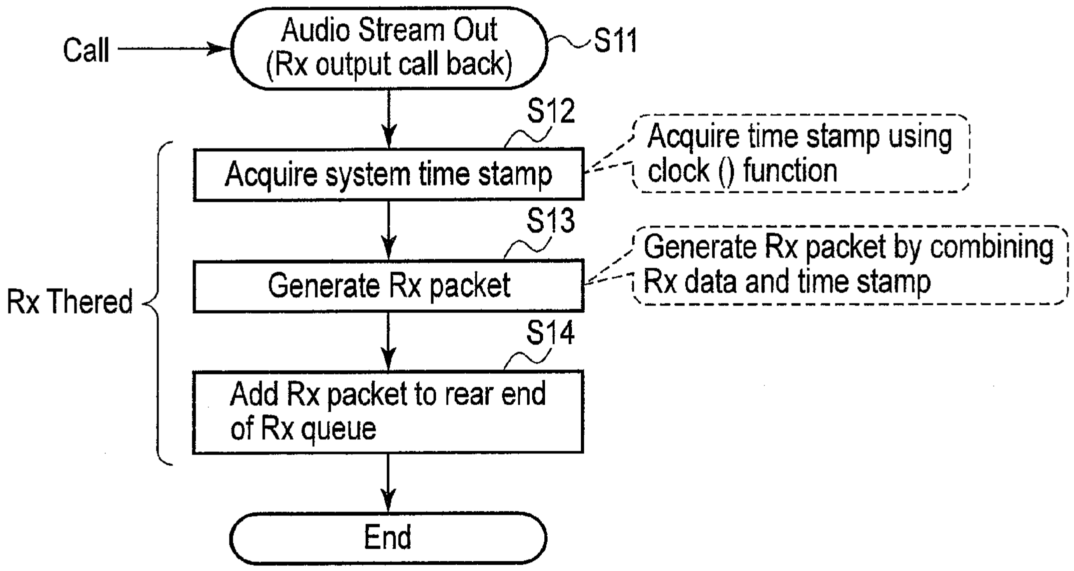
FIG. 6 is an exemplary flowchart illustrating a procedure of processing executed by the Rx thread in the Tx/Rx synchronization controller shown in FIG. 2.

FIG. 6 is a flowchart illustrating the processing executed by the Rx thread 50 in the Tx/Rx synchronization controller 24.

When the output task (AudioStreamOut) 21 is called by the operating system (step S11), it outputs an Rx signal. This Rx signal is sent to the loud speaker 11 via the driver layer 13, and also to the Rx thread 50. Upon receiving the Rx signal, the Rx thread 50 acquires a current clock time as a time stamp (system time stamp) through the operating system, using a clock function (step S12).

The Rx thread 50 generates the above-mentioned Rx packet containing the Rx signal (buffer), its buffer size and its time stamp (step S13). After that, the Rx thread 50 adds the Rx packet to the rear end of the variable length Rx queue 52 (step S14). The processing at steps S12 to S14 is executed whenever an Rx signal is received.

Figure 7:
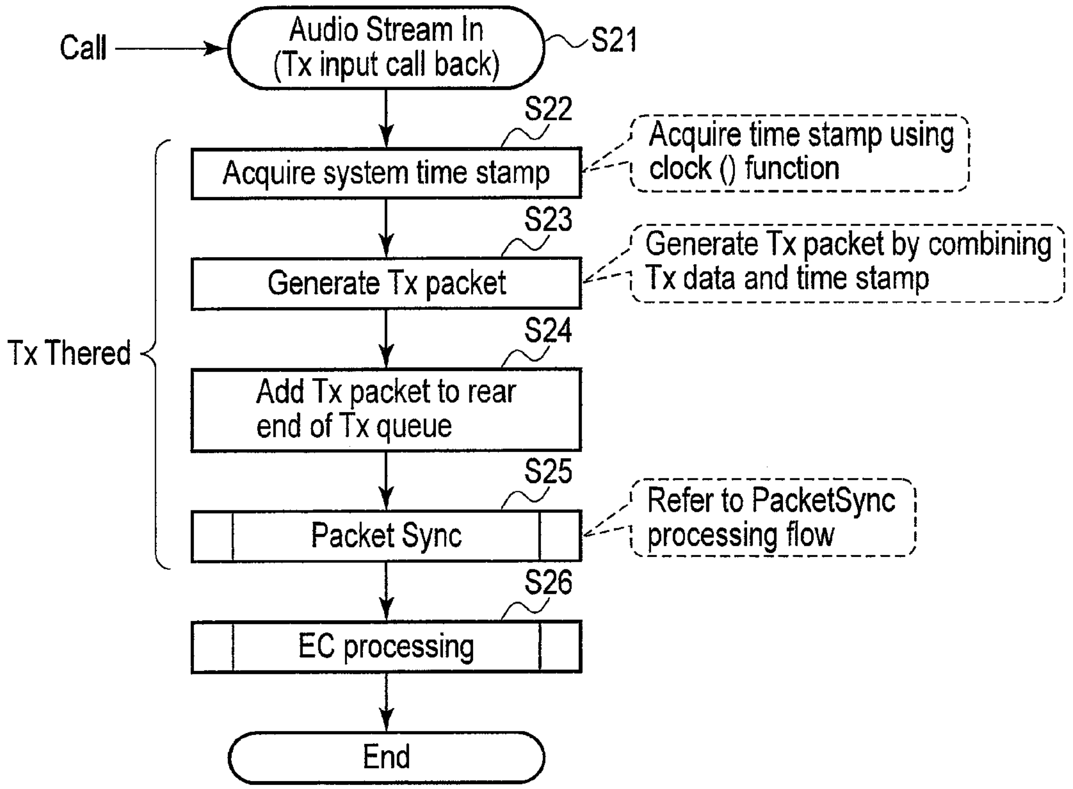
FIG. 7 is an exemplary flowchart illustrating a procedure of processing executed by a Tx thread in the Tx/Rx synchronization controller shown in FIG. 2.

FIG. 7 is a flowchart illustrating the processing executed by the Tx thread 60 of the Tx/Rx synchronization controller 24.

When the input task (AudioStreamIn) 22 is called by the operating system (step S21), the input task (AudioStreamIn) 22 outputs a Tx signal. This Tx signal is sent to the Tx thread 60. Upon receiving the Tx signal, the Tx thread 60 acquires a current clock time as a time stamp (system time stamp) through the operating system, using a clock function (step S22). The Tx thread 60 generates the above-mentioned Tx packet containing the Tx signal (buffer), its buffer size and its time stamp (step S23). After that, the Tx thread 60 adds the Tx packet to the rear end of the variable length Tx queue 62 (step S24).

Subsequently, the time stamp comparing module 64 of the Tx thread 60 executes the above-described synchronization control operation (step S25). More specifically, at step S25, the time stamp comparing module 64 fetches, from the Rx queue 52, an Rx packet of a time stamp (Rx Time) whose difference from the time stamp (Tx Time) of the leading Tx packet in the Tx queue 62 falls within a predetermined range. At this time, the time stamp comparing module 64 compares the time stamp (Tx Time) of the leading Tx packet in the Tx queue 62 with the time stamp (Rx Time) of the leading Rx packet in the Rx queue 52 to calculate the time difference (=Tx Time−Rx Time) therebetween. After that, the echo canceller (EC) 23 performs the above-mentioned echo cancelling processing, using the Tx signal in the leading Tx packet of the Tx queue 62 and the Rx signal in the fetched Rx packet (step S26). At step S26, noise cancelling processing (NC) may be executed along with the echo cancelling (EC) processing.

Figure 8:
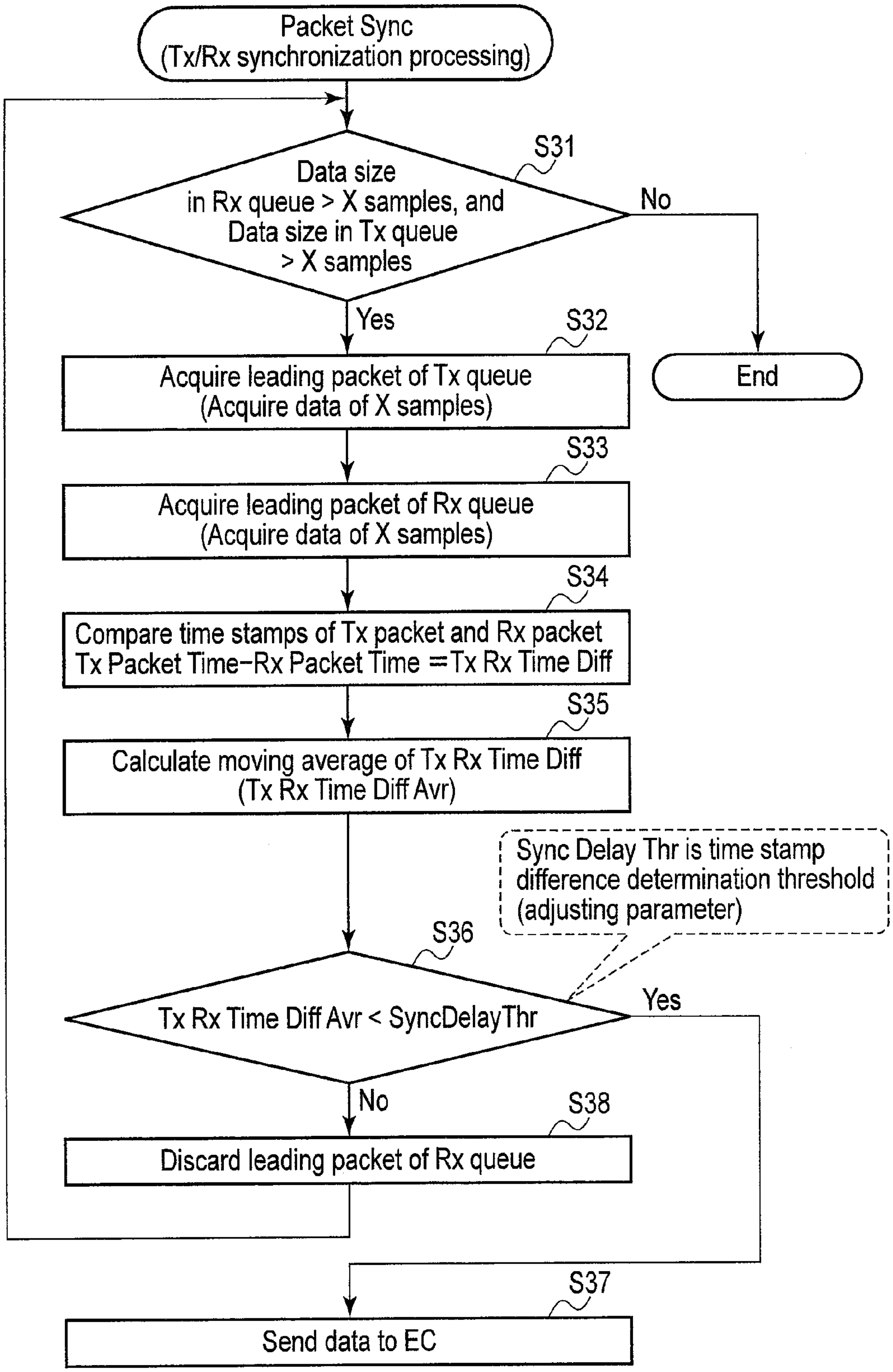
FIG. 8 is an exemplary flowchart illustrating a procedure of packet synchronization processing executed by the Tx thread in the Tx/Rx synchronization controller shown in FIG. 2.

FIG. 8 is a flowchart illustrating the synchronization control operation executed by the Tx thread 60. The Tx thread 60 determines whether a condition that the data size of the data accumulated in the Tx queue 62 is greater than the data size (X samples) required for echo cancelling processing, and that the data size of the data accumulated in the Rx queue 52 is greater than the data size (X samples) required for echo cancelling processing is satisfied (step S31).

If the condition is satisfied (Yes at step S31), the Tx thread 60 acquires the leading Tx packet from the Tx queue 62 (step S32) and als acquires the leading Rx packet from the Rx queue 52 (step S33). At step S32, the Tx thread 60 may extract a time stamp from the leading Tx packet of the Tx queue 62, and then extract data corresponding to the X samples from the leading Tx packet of the Tx queue 62. Similarly, at step S33, the Tx thread 60 may extract a time stamp from the leading Rx packet of the Rx queue 52, and then extract data corresponding to the X samples from the leading Rx packet of the Rx queue 52.

Subsequently, the Tx thread 60 compares the extracted Tx packet time stamp with the extracted Rx packet time stamp to thereby calculating the time difference (TxRxTimeDiff) therebetween (step S34). Thereafter, the Tx thread 60 calculates the moving average (TxRxTimeDiffAvr) of the time differences (TxRxTimeDiff) obtained based on some previously calculated time differences (TxRxTimeDiff) and a currently calculated time difference (TxRxTimeDiff) (step S35).

The Tx thread 60 determines whether the deviation of the synchronization has occurred, depending upon whether the moving average (TxRxTimeDiffAvr) is less than a threshold (SyncDelayThr) corresponding to the above-described predetermined range (step S36). If the moving average (TxRxTimeDiffAvr) is less than the threshold (SyncDelayThr) corresponding to the above-described predetermined range (Yes at step S36), the Tx thread 60 supplies the echo canceller (EC) 23 with the data corresponding to the X samples and fetched from the leading Tx packet of the Tx queue 62, and the data corresponding to the X samples and fetched from the leading Rx packet of the Rx queue 52 (step S37). Alternatively, the Tx thread 60 may only inform the echo canceller (EC) 23 that the Tx and Rx signals are synchronized. In this case, the echo canceller (EC) 23 extracts data corresponding to the X samples from the leading Tx packet of the Tx queue 62, and extracts data corresponding to the X samples from the leading Rx packet of the Rx queue 52.

If the moving average (TxRxTimeDiffAvr) is not less than the threshold (SyncDelayThr) corresponding to the above-described predetermined range (No at step S36), the Tx thread 60 determines that the deviation of the synchronization has occurred because of the above-described fluctuation, thereby discarding the leading Rx packet of the Rx queue 52 and moving the second Rx packet of the Rx queue 52 to the front end of the same (step S38). Thus, by discarding the leading Rx packet of the Rx queue 52, the Rx and Tx signals can be adjusted in timing. Namely, even if a phenomenon wherein some Rx packets older than the leading Tx packet of the Tx queue 62 are accumulated in the Rx queue 52 because of the above-mentioned fluctuation, the Rx signal corresponding to the Tx signal of the leading Tx packet of the Tx queue 62 can be provided to the echo canceller (EC) 23.

Figure 9:
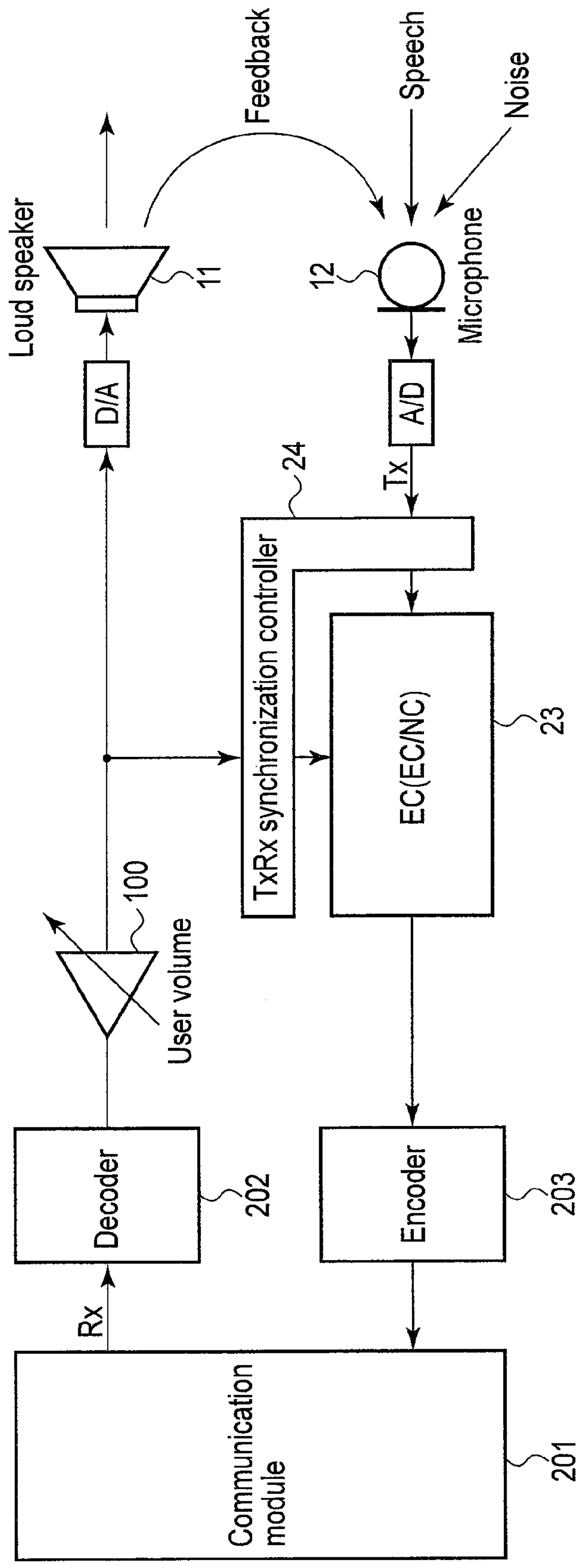
FIG. 9 is an exemplary block diagram illustrating a configuration example of an application layer incorporated in the signal processing apparatus of the embodiment.

FIG. 9 shows a structure example of the application layer 15 of the signal processing apparatus 10. In this case, the signal processing apparatus 10 comprises a user volume 100, a communication module 201, a decoder 202 and an encoder 203, as well as the above-described loud speaker 11, microphone 12, echo canceller (EC) 23 and Tx/Rx synchronization controller 24. The user volume 100 varies the volume level of the output sound data in accordance with a user operation. The communication module 201, the decoder 202 and the encoder 203 function as application modules for performing speech communication using the above-mentioned VoIP. The speech signal (Rx signal) received from a remote terminal (far end) is decoded by the decoder 202. The decoded speech signal is sent to a D/A converter and the Tx/Rx synchronization controller 24 via the output task (AudioStreamOut) 21. The decoded speech signal is converted from a digital speech signal to an analog speech signal by the D/A converter, and a sound corresponding to the analog speech signal is output from the loud speaker 11.

The sound output from the loud speaker 11 is fed back to the microphone 12 as an echo (acoustic echo). The speech signal collected by the microphone 12 is converted from the analog speech signal to a digital speech signal by an A/D converter. The digital speech signal (Tx signal) is sent to the Tx/Rx synchronization controller 24 via the output task (AudioStreamOut) 21. The Tx/Rx synchronization controller 24 extracts an Rx signal corresponding to the Tx signal from the Rx queue 52, and sends the Tx and Rx signals to the echo canceller (EC) 23. The echo canceller (EC) 23 generates an echo replica signal based on the Rx signal, and subtracts the echo replica signal from the Tx signal. The residual signal obtained by subtracting the echo replica signal from the Tx signal, i.e., an Rx signal with acoustic echoes suppressed, is encoded by the encoder 203. The encoded Rx signal is sent to the remote terminal via the communication module 201.

Figure 10:
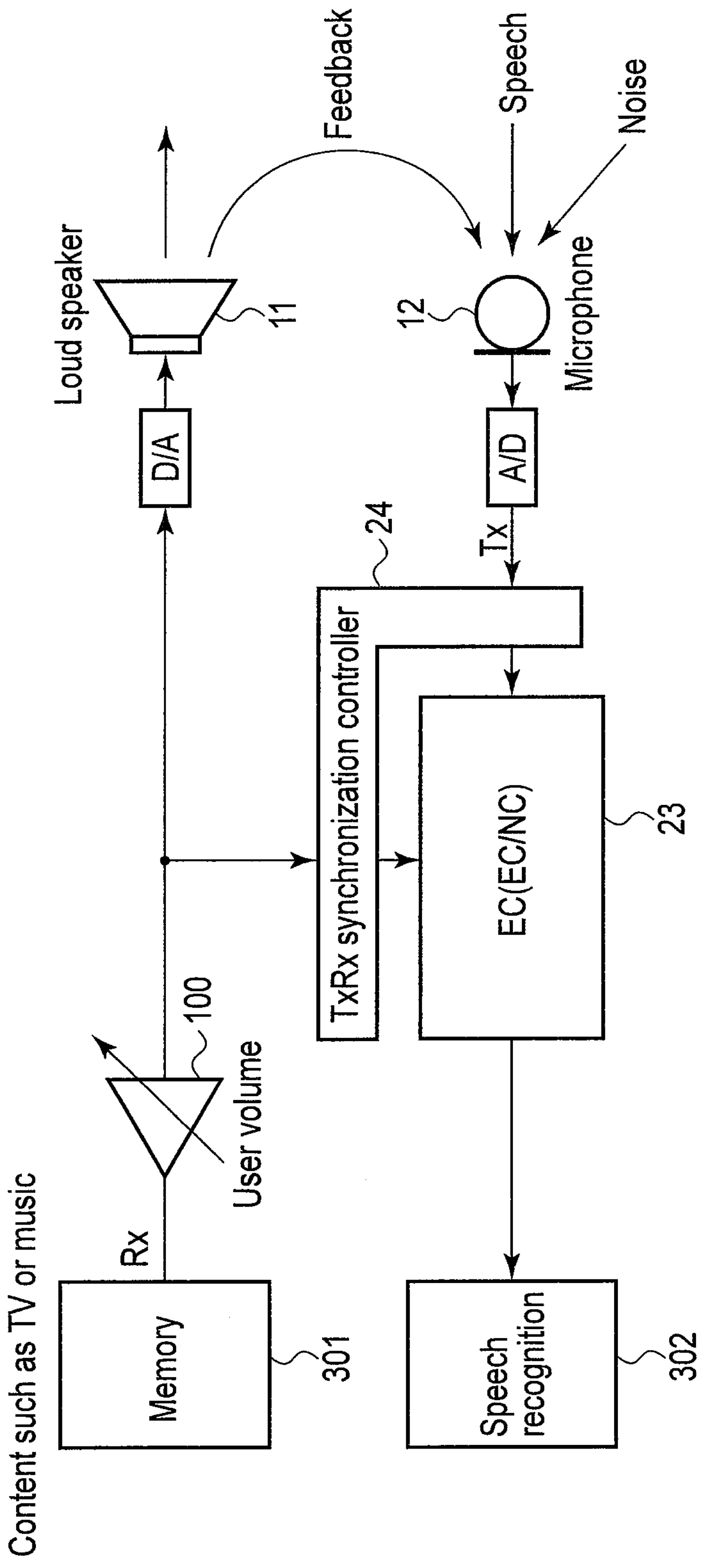
FIG. 10 is an exemplary block diagram illustrating another configuration example of the application layer incorporated in the signal processing apparatus of the embodiment.

FIG. 10 shows another structure example of the application layer 15 of the signal processing apparatus 10. In this case, the signal processing apparatus 10 comprises a memory 301 and a speech recognition module 302, in place of the communication module 201, the decoder 202 and the encoder 203 shown in FIG. 9. The memory 301 stores content data (media data) such as TV programs and music. The speech recognition module 302 functions as an application program for recognizing a speech signal input through the microphone 12. The signal processing apparatus 10 also executes an application program for reproducing media data. In the signal processing apparatus 10 shown in FIG. 10, a sound corresponding to the reproduced media data is fed back as an echo (acoustic echo) to the microphone 12. This echo can also be suppressed by the echo canceller (EC) 23.

As described above, in the embodiment, the output sound data (Rx signal) output from the output task 21 is added to the Rx queue 52 with a time stamp attached, while the input sound data (Tx signal) received by the input task 52 from the microphone 12 is added to the Tx queue 62 with a time stamp attached. Further, output sound data with a time stamp whose difference from the time stamp of the leading input sound data in the Tx queue 62 falls within a predetermined range is extracted as reference data from the Rx queue 52. Based on the reference data, the echo canceller (EC) 23 cancels an echo component in the leading input sound data of the Tx queue 62. By thus extracting, as reference data from the Rx queue 52, output sound data with a time stamp whose difference from the time stamp of the leading input sound data in the Tx queue 62 falls within a predetermined range, estimation of the echo component can be performed reliably, which enables a reliable echo cancelling operation to be performed even under an environment in which an echo canceller (EC) is incorporated in a non realtime OS.

Since the Tx/Rx synchronization controller 24 of the embodiment can be realized by software, the advantage of this controller can be easily realized simply by installing a computer program capable of executing the processing procedure of the Tx/Rx synchronization controller 24, into a computer, such as the information terminal, by way of a computer-readable storage medium which stores the computer program.

Moreover, each of the Tx/Rx synchronization controller 24 and the echo canceller (EC) 23 may be realized by dedicated or general-purpose hardware.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A signal processing apparatus configured to execute a plurality of tasks including a first task for sending, to a loud speaker of the signal processing apparatus, a reproduction target sound stream received from an application layer, and a second task for acquiring a sound stream from a microphone of the signal processing apparatus, the apparatus comprising:

a first processing module configured to add, to a first queue, output sound data output from the first task, with a time stamp attached to the output sound data;

a second processing module configured to add, to a second queue, input sound data which is acquired from the microphone by the second task, with a time stamp attached to the input sound data;

a controller configured to fetch first output sound data as reference data from the first queue, the first output sound data having a time stamp whose time difference from a time stamp of first input sound data in the second queue falls within a predetermined range, the first input sound data being leading input sound data of the second queue; and an echo canceller configured to perform echo cancelling processing to cancel an echo component in the first input sound data based on the reference data.

2. The signal processing apparatus of claim 1, wherein the controller is further configured to:

compare the time stamp of the first input sound data with the time stamp of a leading output sound data of the first queue;

if a time difference between the time stamp of the first input sound data and the time stamp of the leading output sound data of the first queue falls within a predetermined range, cause the echo canceller to perform execute echo cancelling processing on the first input sound data to use the leading output sound data as the reference data; and if the time difference between the time stamp of the first input sound data and the time stamp of the leading output sound data of the first queue falls outside the predetermined range, discard the leading output sound data of the first queue to move second output sound data of the first queue to a front end of the first queue.

3. The signal processing apparatus of claim 2, wherein the controller is further configured to:

calculate a first time difference between the time stamp of the first input sound data and the time stamp of the leading output sound data of the first queue;

calculate an average of all time differences including the first time difference and a plurality of time differences, the plurality of time differences being obtained by a predetermined number of time stamp comparisons immediately before, and determine whether the calculated average falls within the predetermined range.

4. The signal processing apparatus of claim 1, wherein the controller is further configured to:

check data size of data stored in the first queue and data size of data stored in second queue; and if each of the first and second queues stores data of a data size necessary for the echo cancelling processing, execute processing for fetching the first output sound data as the reference data from the first queue.

5. A signal processing method for use in a signal processing apparatus configured to execute a plurality of tasks including a first task for sending, to a loud speaker of the signal processing apparatus, a reproduction target sound stream received from an application layer, and a second task for acquiring a sound stream from a microphone of the signal processing apparatus, the method comprising:

adding, to a first queue, output sound data output from the first task, with a time stamp attached to the output sound data;

adding, to a second queue, input sound data which is acquired from the microphone by the second task, with a time stamp attached to the input sound data;

fetching first output sound data as reference data from the first queue, the first output sound data having a time stamp whose time difference from a time stamp of first input sound data in the second queue falls within a predetermined range, the first input sound data being leading input sound data of the second queue; and performing echo cancelling processing to cancel an echo component in the first input sound data based on the reference data.

6. A computer-readable, non-transitory storage medium having stored thereon a computer program which is executable by a computer, the computer being configured to execute a plurality of tasks including a first task for sending, to a loud speaker of the computer, a reproduction target sound stream received from an application layer, and a second task for acquiring a sound stream from a microphone of the computer, the computer program controlling the computer to execute functions of:

adding, to a first queue, output sound data output from the first task, with a time stamp attached to the output sound data;

adding, to a second queue, input sound data which is acquired from the microphone by the second task, with a time stamp attached to the input sound data;

fetching first output sound data as reference data from the first queue, the first output sound data having a time stamp whose time difference from a time stamp of first input sound data in the second queue falls within a predetermined range, the first input sound data being leading input sound data of the second queue; and performing echo cancelling processing to cancel an echo component in the first input sound data based on the reference data.

* * * * *